United States Patent [19]
Jones

[11] 3,863,995
[45] Feb. 4, 1975

[54] FLUID BEARING ASSEMBLY
[75] Inventor: Cecil R. Jones, Orange, Conn.
[73] Assignee: Transfer Systems Incorporated, North Haven, Conn.
[22] Filed: Oct. 23, 1973
[21] Appl. No.: 408,995

[52] U.S. Cl.................... 308/9, 308/3 A, 308/3.5
[51] Int. Cl...................... F16c 29/02, F16c 33/72
[58] Field of Search............ 308/3 R, 3 A, 3 C, 3.5, 308/5 R, 9, DIG. 1

[56] References Cited
UNITED STATES PATENTS
1,673,163 6/1928 Schmelzkopf...................... 308/3 A
2,976,087 3/1961 Cherubim............................... 308/9
3,799,628 3/1974 Gaasbeek et al. ..................... 308/9
3,813,133 5/1974 Walter et al............................ 308/9

Primary Examiner—M. Henson Wood, Jr.
Assistant Examiner—Robert Saifer

[57] ABSTRACT

A fluid bearing assembly for a machine is described which offers the advantages of reduced friction while maintaining a minimum flow rate of the working fluid. This is accomplished by including in the bearing assembly means for introducing pressurized fluid between bearing surfaces, and embedding a seal member directly in one of the bearing surfaces so as to surround the fluid inlet and extend completely between the latter and the outlet for the fluid.

7 Claims, 6 Drawing Figures

PATENTED FEB 4 1975 3,863,995

SHEET 3 OF 3

FLUID BEARING ASSEMBLY

This invention relates to a fluid bearing assembly for machines.

Fluid film bearings wherein the machine rubbing or bearing surfaces are completely separated by a fluid film are well-known in the art. For proper operation, the fluid must be fed to the bearing surfaces under pressure in order to lift the load and maintain an oil film between the bearing surfaces. This entails high fluid leakage flow and thus a high fluid volume supply system, which is disadvantageous. Moreover, certain applications where such bearings could be extremely useful do not permit high leakage rates of fluid.

The chief object of the invention is a bearing assembly providing the reduced friction afforded by the use of fluid films while at the same time minimizing the fluid flow rate required to maintain the fluid film.

This is attained in accordance with the invention by the addition to the normal machine bearing assembly of means for introducing via a restricted inlet pressurized fluid between bearing surfaces in order to lift the load off the bearing assembly and reduce friction. A seal member is embedded directly in one of the bearing surfaces so as to surround the fluid inlet and extend completely between the latter and the fluid outlet. The applied pressure and configuration are such that the seal member is maintained in a substantially non-compressed condition lightly bearing against the opposed bearing surface, thereby defining a restricted opening for the pressurized fluid to flow from its inlet to an outlet located beyond the embedded seal member.

In a preferred embodiment, the bearing assembly is a guide bearing for linear motion, and comprises a round way in the form of a solid cylindrical rod formed to close tolerances and affixed to a suitable bed or support, and to the underside of a carriage for motion along the round way are affixed roller or ball bearings of a conventional type and capable of resisting side as well as vertical loads. To this assembly is added a pressure bearing comprising a solid block having a semi-cylindrical bearing surface configured to rest on the round way. An annular seal mounting groove is formed in the semi-cylindrical bearing surface and in the groove is mounted an annular sealing member. A fluid inlet is provided in the block so as to terminate within the annular seal. Fluid is pumped into the inlet under sufficient pressure to lift slightly the carriage until the seal member is substantially non-compressed yet lightly bears against the roundway restricting the flow of fluid from the inlet past the seal to the fluid outlet located beyond the seal. Due to the carriage lifting provided by the pressurized fluid, the load on the normal bearings present is significantly reduced, thereby significantly reducing the friction forces opposing the linear motion of the carriage along the round way.

A more detailed description of several exemplary embodiments of the invention follows below, taken in conjunction with the accompanying drawings wherein.

Figure 1:
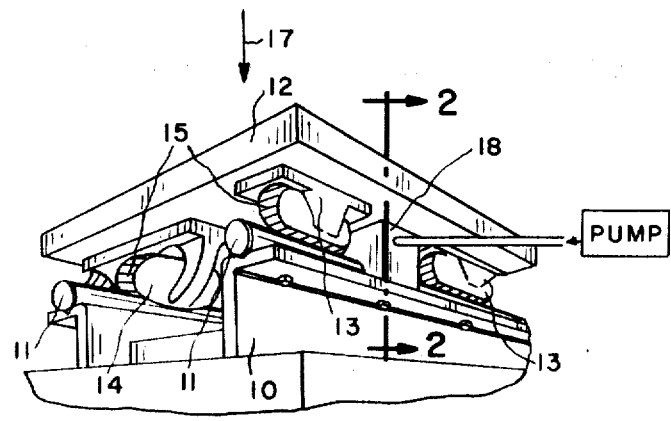
FIG. 1 is a perspective view of one form of guide bearing assembly in accordance with the invention.

FIG. 1 depicts a machine comprising a linear bearing assembly in accordance with the invention. The machine comprises a fixed bed or support 10 supporting on its top surfaces a linear bearing surface in the form of a pair of solid cylindrical rods 11 carefully machined to close tolerances, which is known in the art as a round way. A carriage 12 is movable in a linear motion over the bed 10. Affixed to the underside of carriage 12 is a set of normal roller bearings 13, 14 available commercially. In the form shown, the roller bearings each comprise a train of concave rollers 15 configured to bear on the round ways 11. The carriage has affixed to it front and rear bearings 13, and front and rear bearings 14 (the rear bearing 14 is hidden). The bearings 13 are designed only to take a vertical load, and each thus comprises a single train of rollers. To keep the carriage on its bed, the bearings 14 each comprise a pair of trains of rollers in order to resist side loads.

In the system so far described, which is conventional, the frictional forces opposing the linear motion are dependent upon the load exerted by the carriage 12 on the bed 10 via the bearing surfaces, which include the cylindrical surface on the round ways 11 and the concave roller surfaces on the bearings 13, 14. The heavier the load exerted by the carriage, shown by the vertical arrow designated 17, the higher the friction along the bearing surfaces.

Figure 2:
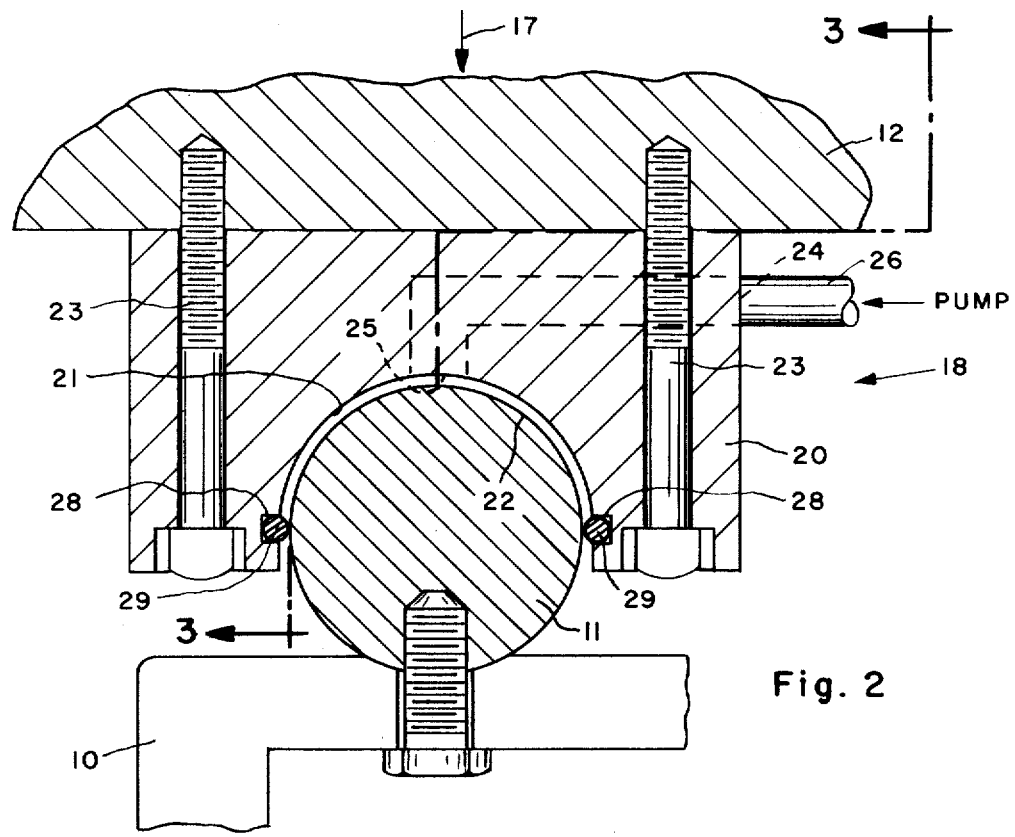
FIG. 2 is a cross-sectional view of part of the guide bearing assembly of FIG. 1 taken along the line 2—2.
Figure 3:
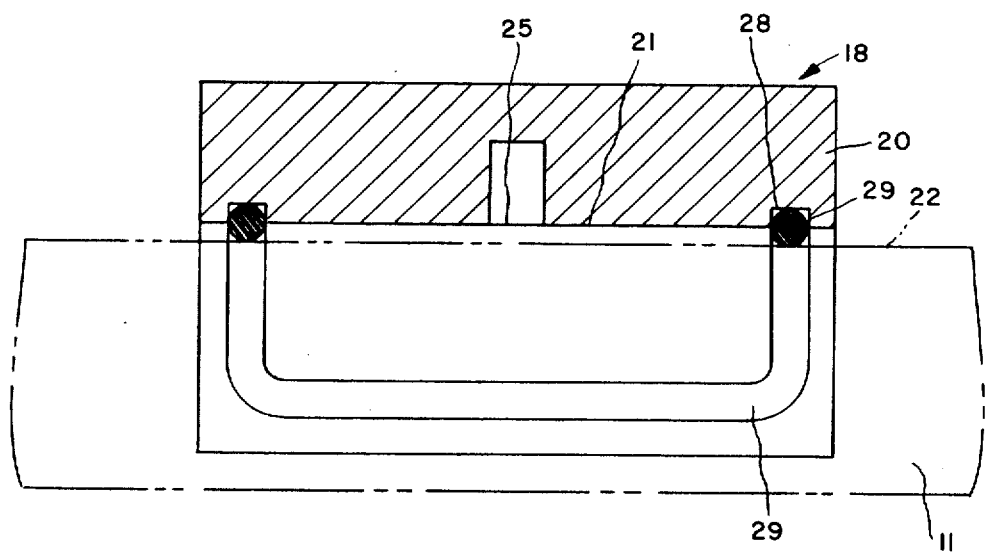
FIG. 3 is a cross-sectional view of the guide bearing assembly of FIG. 2 taken along the line 3—3.
Figure 4:
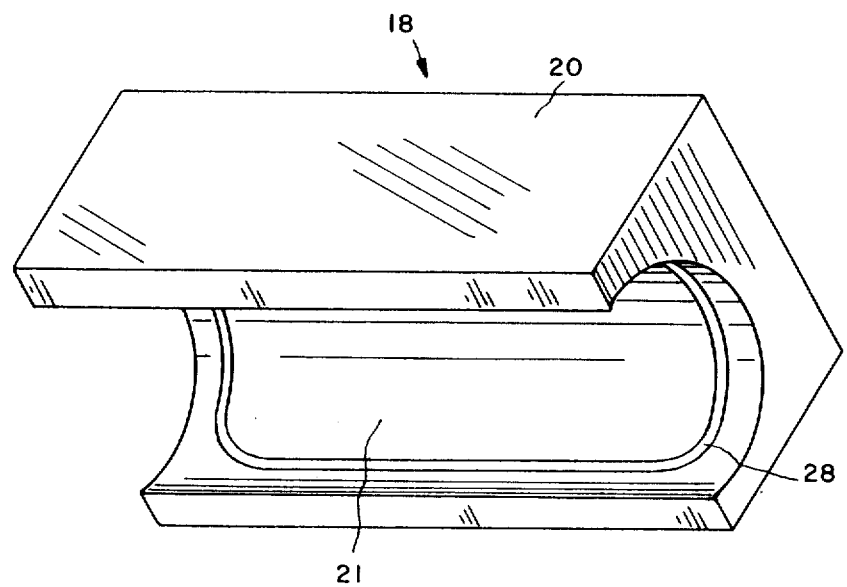
FIG. 4 is a perspective view of just the pressure bearing block part of the guide bearing assembly of FIG. 1.

The invention provides a construction for minimizing the friction by the addition of a fluid or pressure bearing. In accordance with the invention, to the bearing assembly so far described are added on each side of the carriage a fluid bearing 18. One fluid bearing 18 as shown is located between the bearings 13, and one fluid bearing 18 (not shown) is located between the bearings 14. Each fluid bearing 18 comprises a solid block 20 (see FIGS. 2–4), which may be for example of metal, having a semi-cylindrical bearing surface 21 configured to match the similarly shaped bearing surface 22 of the round way 11 to close tolerances. The block 20 may be mounted in any suitable manner on the carriage 12, such as for example by bolts 23. Extending through the block 21 is an aperture or opening starting from a side wall as shown at 24 and terminating in the approximate center of the bearing surface 21 as shown at 25. A suitable fitting 26 may be connected to the opening at 24, and through the fitting is pumped a suitable working fluid at high pressure so as to exit from the block 20 at the opening 25 and thus impinge upon the round way bearing surface 22 in a direction generally orthogonal to the confronting bearing surfaces 22, 21 so as to exert a force on the bearing surface 22 tending to lift the carriage 12 and thus oppose and balance out the downward load force 17. For a reasonably heavy load, this would require a very high fluid leakage flow in order to maintain the lift on the carriage. To reduce the flow rate without a concomitant increase in the frictional forces, an annular groove 28 is formed directly in the bearing surface 21 of the block 20 so as to surround the fluid inlet at 25. Seated in the groove 28 is an annular seal member 29. The seal member 29 is preferably composed of a hard low friction material, such as Teflon for example. Metal, such as aluminum, can also be used. The total lift applied by the fluid pressure should be such as to cause the seal member 29 to be at most slightly in contact with the round way to provide as little clearance as possible for the fluid flow from the inlet 25 to its outlet on the outside past the seal. If the fluid pressure drops increasing the contact between seal and round way, the frictional forces will be increased. It is thus desirable that the round way be as accurately round as possible in order to obtain the best fit with the fluid bearing over its entire length. While air is the preferred working fluid, water or hydraulic oil can also be employed.

The bearing assembly of the invention is best suited for heavy loads and for linear motion bearings as described in connection with FIGS. 1–4. However, the principles involved also offers advantages for other types of bearings.

Figure 5:
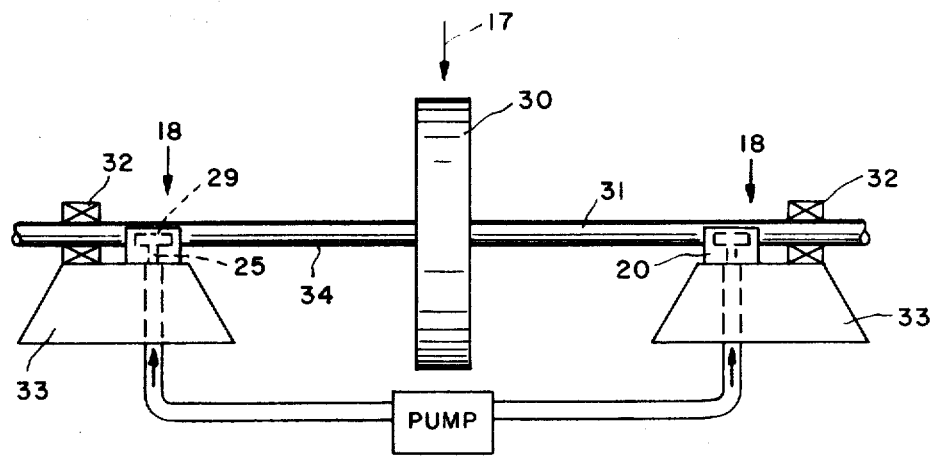
FIG. 5 illustrates application of the principles of the invention to a journal bearing assembly.

FIG. 5 illustrates application of the invention to a journal bearing system. A heavy flywheel 30 on a shaft 31 driven by means not shown is journalled at opposite ends in conventional bearings 32 supported on fixed base members 33. Also supported on the base members 33 are fluid bearings 18 similar to that depicted in FIGS. 1–4, except that the block 20 now is reversed in position such that its semi-cylindrical bearing surface 21 faces upwardly and embraces approximately half of the rotating shaft 31. Pressure is supplied as before by a pump which forces fluid through the bearing inlet 25 against the confronting shaft bearing surface 34 until the shaft is lifted and the flywheel load carried mostly by the fluid pressure, thereby greatly reducing the frictional forces in the journal bearings 32. The fluid flow rate is minimized by the seal member 29 in the bearing surface which surrounds the inlet and restricts the fluid flow to the outside.

Figure 6:
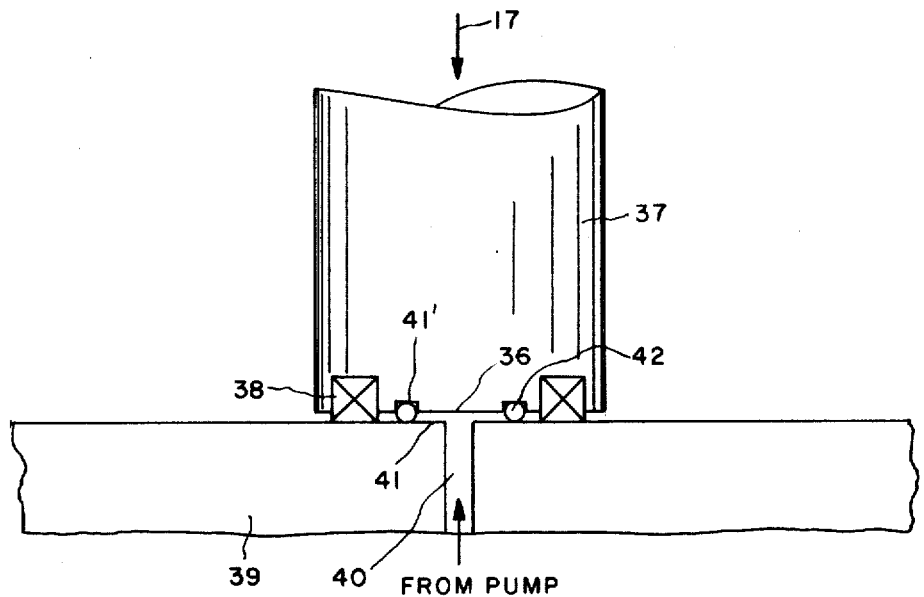
FIG. 6 illustrates application of the principles of the invention to a thrust bearing assembly.

FIG. 6 illustrates application of the principle to a thrust bearing. The end 36 of a shaft 37 journalled in bearings not shown for rotary motion exerts a downward load on a conventional thrust bearing 38 supported on a fixed base member 39. To reduce the friction in the bearing 38, an aperture 40 is provided in the base member 39 terminating in its bearing surface 41 confronting the opposing shaft end 36. A groove 41' is provided in the bearing surface 36 to surround the aperture 40, and mounted in the groove is an O-type sealing ring 42 similar to that described in connection with FIGS. 1–4. Fluid is pumped through the aperture 40 to lift the shaft 37 and thus reduce the load on the bearing 38 thereby reducing frictional forces therein. The O-ring seal 42 restricts the fluid flow necessary to keep the shaft load lifted. It will also be evident that the seal 42 can if desired be mounted in the lower bearing surface 41.

It will be clear from the foregoing description that the exact nature of the conventional bearings employed in the system according to the invention is not important. Roller bearings as depicted in FIGS. 1–4 can be employed, or ball or other known types of rolling or sliding contact bearings can be substituted. Whatever type of ordinary bearing is used to carry the load of the moving member and stabilize its position or mounting in order to hold it on the fixed member, the frictional forces within the bearing resisting the movement are reduced by incorporation of the additional fluid bearing to lift the load. Should the fluid bearing fail, such as by loss of the fluid pressure, the regular bearings present will be capable of fully supporting the load.

While my invention has been described in connection with specific embodiments thereof, those skilled in the art will recognize that various modifications are possible within the principles enunciated herein and thus the present invention is not to be limited to the specific embodiments disclosed.

What is claimed is:

1. In combination with a machine having first and second parts movable relative to one another along confronting first and second bearing surfaces with the first of the movable parts exerting a load in a given direction including a component generally orthogonal to the confronting bearing surfaces and tending to increase the frictional forces resisting the movement at the first and second bearing surfaces, a fluid bearing comprising means on one of the parts providing a third bearing surface extending generally orthogonal to the load direction component and confronting the second bearing surface on the other of the parts, at least one opening in one of the second and third bearing surfaces, an annular sealmember mounted in one of the second and third bearing surfaces so as to protrude therefrom and surround said opening, means for furnishing pressurized fluid to the said opening, the location of the opening and the fluid pressure being such that the fluid exits from said opening and impinges on the confronting bearing surface in a direction so as to provide a fluid force substantially opposite to the load and tending to lift the load of the first part and thereby reduce the frictional forces at the first and second bearing surfaces, the seal member being located in a position to impede the flow of fluid between the second and third bearing surfaces.

2. The combination of claim 1 wherein the first and second bearing surfaces are constituted by a non-fluid bearing assembly which is alone capable of carrying the full load of the movable parts, and the means providing the third bearing surface comprises a bearing member separate and apart from the non-fluid bearing assembly.

3. The combination of claim 2 wherein the first and second parts move in a linear direction relative to one another, and the first part is arranged above the second part and exerts a downward load thereon.

4. The combination of claim 3 wherein the second part is fixed, the first part is movable, the bearing member is mounted on the first part with the said opening located in the third bearing surface confronting the second bearing surface, said third bearing surface having an annular groove surrounding the opening, said seal member being mounted in the groove, and the fluid pressure being such as to separate the first and second parts and minimize contact between the seal member and the second bearing surface.

5. The combination of claim 4 wherein the second bearing surface comprises a round way, and the fluid bearing comprises a block having a semi-cylindrical third bearing surface configured to match that of the round way, the seal member being embedded in the third bearing surface.

6. The combination of claim 3 wherein the first part is a shaft adapted for rotary movement and the first and second bearing surfaces form a journal bearing supporting the shaft for rotary movement, the fluid bearing comprising a block having a semi-cylindrical third bearing surface configured to match that of the shaft and underlying the shaft, the seal member being embedded in the third bearing surface.

7. The combination of claim 3 wherein the first part is a shaft defining with the second part first and second bearing surfaces forming a thrust bearing, the third bearing surface being constituted by the shaft end with the seal member embedded in the third bearing surface.

* * * * *